Sept. 7, 1965 T. ANNER 3,204,737
CENTRIFUGAL CLUTCH WITH AN EXPANDING EFFECT
Filed July 13, 1962
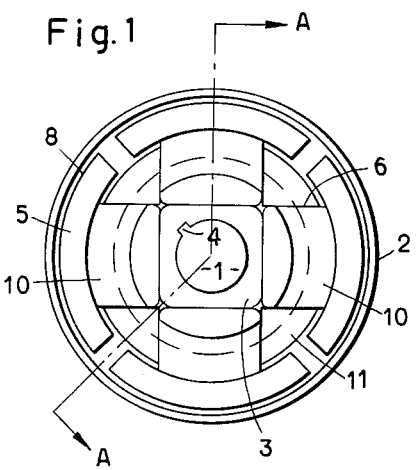
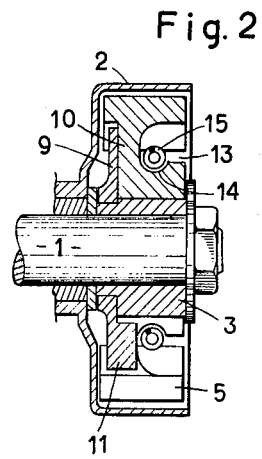
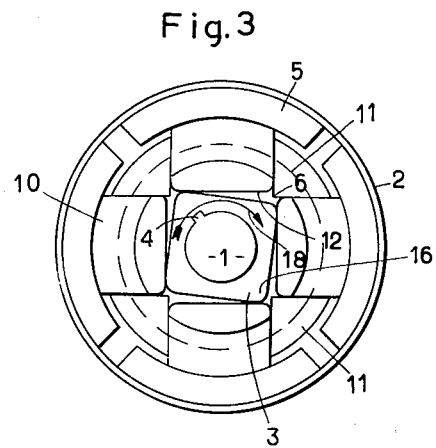
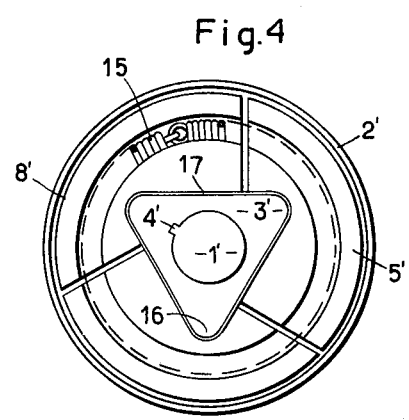
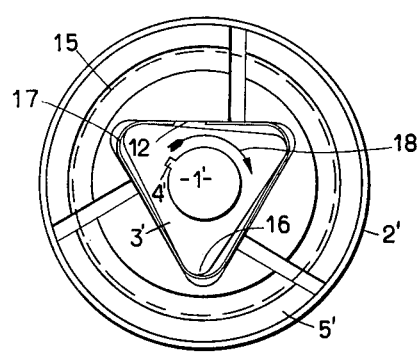

United States Patent Office 3,204,737
Patented Sept. 7, 1965

3,204,737
CENTRIFUGAL CLUTCH WITH AN EXPANDING EFFECT
Tycko Ånner, Edsbyn, Sweden, assignor to Edsbyns Industri Aktiebolag, Edsbyn, Sweden, a joint-stock manufacturing company
Filed July 13, 1962, Ser. No. 209,526
Claims priority, application Sweden, Jan. 16, 1962, 443/62
3 Claims. (Cl. 192—105)

This invention relates to centrifugal clutches, which are adapted to be engaged by means of radially movable chucks or clutch members actuated by a driving, rotating center member or cam to cooperate with a rotatably journalled drum surrounding said center member.

An object of the invention is to provide a shape of the clutch such that, when the center member or cam is rotatably driven, it will by an expanding effect increase the pressure between the chucks and the drum and thereby prevent the clutch from slipping.

This will be achieved by making a clutch comprising a rotating center member of polygonal shape having its member of sides corresponding to the number of chucks, a rotatably journalled drum surrounding the center member and the chucks, the chucks being radially movable between the center member and the drum having inner and outer surfaces, the inner surfaces being adapted to move simultaneously toward the center member to define a space surrounding the center member when a clearance exists between the outer surfaces and the drum, the outer surfaces being adapted to engage and rotate the drum, and the center member having rounded on arcuate corners having radii suitable to permit a sufficient expanding effect between the center member and the chucks, with the chucks being separated by the center member.

With these and other objects in view, this invention resides in certain novel features of construction, combinations and arrangements of parts to be hereinafter more fully described and claimed, reference is being made to the following description and accompanying drawing, in which FIGURE 1 is an end view of a centrifugal clutch according to the invention and illustrates the same in a disengaged position with the chucks moved inwards to the position they have at slow speed or rest;

FIGURE 2 is a sectional view along the line A—A in FIGURE 1;

FIGURE 3 is an end view corresponding to FIGURE 1 of the clutch and shows a position of the chucks at a higher speed wherein the chucks move apart and press against the drum; and FIGURES 4 and 5 are end views, corresponding to FIGURES 1 and 3 respectively, showing a modified clutch according to the invention.

The centrifugal clutch as shown in FIGURES 1 to 3 is adapted to be connected at a higher rotating speed to a rotatably journalled driving shaft 1 having a drum 2, which is rotatably journalled coaxially with the shaft. For this purpose a center member 3 is threaded on the end of the shaft and is non-rotatably fixed to the shaft by means of a shaft key-way and a key 4 is shown in FIGURES 1 and 3. A number of chucks or clutching members 5 (in the embodiment shown, four chucks) are arranged between the center member and the drum and are radially movable relative to the member and the drum within a certain clearance. The chucks are hereby guided by a rotatable bushing or disk 9 relative to the center member, said bushing or disk being situated within the chucks and provided with radially extending guiding tracks 6 inside the outer cylindrical drum-engaging surfaces 8 of the chucks which are adapted to co-operate with the drum or a member to be clutched 2, said tracks co-operating with inward directed projections 10 on the chucks. These guiding tracks consist of interspaces between lips 11 projecting axially from the disk. The center member 3 is shaped polygonally having the same number of sides as the number of chucks, for which reason is evident from FIGURES 1 to 3 which shows the center member of a shape having a square cross section. The inner surfaces 12 of the chucks are adapted to move inwards toward the center member or cam 3 to define a space surrounding said center member 3 that has on the whole the same cross section as the center member 3. Recesses 13 in the sides of the projections are shaped with outward directed surface portions 14 which are disposed at a smaller radial distance from the center line of the clutch than from the drum co-operating surfaces 8 of the chucks. Around said surface portions 14 an endless draw spring 15 is laid, which at rest or at a slow speed of the clutch holds the chucks 5 moved inwards in the off position as shown in FIGURE 1.

The tensile force of the endless draw spring shall be adjusted at a desired rotating speed so that by the centrifugal force and against the effect of said spring, the chucks are thrown outwards and contact the inside of the drum 2. The center member 3, which obtains a space to be slightly turned relative to the chucks, will now co-operate by its driving effect to press the chucks against the drum. This expanding effect according to the invention is enlarged by the arrangement that the corners 16 of the center member are rounded with radii such as to provide the desired expanding effect. Naturally, said radii cannot be made too long that the member is tightly wedged between the chucks, so that at a decrease of the rotating speed the member cannot simply return to its off position shown in FIGURE 1.

FIGURES 4 and 5 show a modified embodiment of the centrifugal clutch provided with only three chucks 5'. This centrifugal clutch differs from the above described clutch in the respect that it is made without the bushing or disk 9 and its guiding tracks 6 or projections 10 on the chucks 5'. In order for the clutch to be in its engaging position such that the pressure between the corners of the center member 3' and respective chucks shall attack each chuck on the whole in the middle of the chuck, the center member 3' is arranged to be slightly turned in a counter direction to the rotating directions relative to the chucks' symmetrical position as shown in FIGURES 4 and 5.

To prevent a rattling noise from the chucks at an idle rotating speed, a compressed plate spring 17 is inserted between the chucks and the center member 3', said plate spring at least partly surrounding said center member. This plate spring presses the chucks outward with naturally, a smaller force than the force by which the draw spring 15 is tending to move the chucks together, and at a rotating speed, at which the centrifugal force begins to nullify the effect of the draw spring. The plate spring will prevent uncontrollable swinging of the chucks relative to each other, the center member and the drum 2', thereby preventing rattling noises which would result from such swingings.

The centrifugal clutch as shown in FIGURES 1 to 3 can be used in an arbitrary rotating direction, while the clutch as shown in FIGURES 4 and 5, can only be used in the clockwise direction as is shown by arrow 18.

While the preferred embodiments of the invention are shown and described, it is of course to be understood that the right is reserved to make such changes in the form, construction and arrangement of parts without departing from the spirit of the invention or the scope of the following claims.

I claim:
1. In a centrifugal clutch, a rotatable camming member of generally polygonal shape, a plurality of clutching members, the number of sides of the camming member corresponding to the number of clutching members, a rotatably journalled drum constituting a member to be clutched and having an inner surface surrounding said camming member and clutching members, said clutching members being movable toward and away from said inner surface of the drum and each clutching member having an inner and an outer surface, means biasing said clutching members for movement toward the axes of said camming members, said inner surfaces of the clutching members when in their innermost position defining a space surrounding said camming member and generally corresponding in shape with the cross-section of the cam, the outer surfaces of the clutching members being spaced inward from the inner surface of the drum in disengaged position, said polygonal camming member having arcuate corners having respective radii such as can obtain successful expanding effect responsive to rotation of the camming member to engage the outer surfaces of the clutching members with the inner surface of the drum, a compressed plate spring member disposed between the outer periphery of the camming member and the inner surfaces of the clutching member and said spring member having a length to at least partly surround said camming member so as to prevent rattling of the clutch at slow rotary speeds.

2. The centrifugal clutch as claimed in claim 1 in which said camming member is generally triangular in shape and has rounded corners, there being three clutching member movable between the camming member and the inner surface of said drum, the inner surface of each clutching member constituting an angular surface having two sides interconnected by an arcuate surface and one side of each angular surface being substantially longer than the other with the longest side of the inner surface of one clutching member being adjacent in the direction of rotation to the shortest side of the angular surface of the next adjacent clutching member.

3. The centrifugal clutch as claimed in claim 2 in which said spring member substantially completely surrounds said camming member.

References Cited by the Examiner

UNITED STATES PATENTS

| | | |
|---|---|---|
| 1,032,524 | 7/12 | Wiard. |
| 2,926,483 | 9/33 | Hatcher. |
| 2,224,935 | 12/40 | Schultz. |
| 2,868,343 | 1/59 | Sproul. |
| 2,909,073 | 10/59 | Putz. |
| 2,991,865 | 7/61 | Wilson. |

FOREIGN PATENTS

| | | |
|---|---|---|
| 343,985 | 11/21 | Germany. |
| 546,782 | 3/32 | Germany. |
| 1,002,994 | 2/57 | Germany. |

DAVID J. WILLIAMOWSKY, *Primary Examiner.*

THOMAS J. HICKEY, *Examiner.*